United States Patent
Korzunov

(10) Patent No.: US 9,322,666 B2
(45) Date of Patent: Apr. 26, 2016

(54) METHOD FOR DISPLAYING A POSITION ON A MAP

(71) Applicant: YANDEX EUROPE AG, Lucern (CH)

(72) Inventor: Anton Vasilyevich Korzunov, Podolsk (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 14/798,819

(22) Filed: Jul. 14, 2015

(65) Prior Publication Data

US 2015/0377627 A1    Dec. 31, 2015

Related U.S. Application Data

(63) Continuation of application No. PCT/IB2015/050102, filed on Jan. 6, 2015.

(30) Foreign Application Priority Data

Jun. 30, 2014    (RU) .................................. 2014126767

(51) Int. Cl.
*G01C 21/00*    (2006.01)
*G01C 21/36*    (2006.01)
(Continued)

(52) U.S. Cl.
CPC .............. *G01C 21/367* (2013.01); *G01C 21/30* (2013.01); *G01C 21/32* (2013.01)

(58) Field of Classification Search
CPC ....... G01C 21/32; G01C 20/20; Y10S 707/92
USPC .................. 701/431, 435, 461; 340/988, 990, 340/995.14; 707/999.102
See application file for complete search history.

(56) References Cited

U.S. PATENT DOCUMENTS

| | | | | |
|---|---|---|---|---|
| 5,237,647 A | * | 8/1993 | Roberts | .................. G06F 3/038 178/18.01 |
| 5,748,109 A | * | 5/1998 | Kosaka | .............. G01C 21/3635 340/988 |

(Continued)

FOREIGN PATENT DOCUMENTS

| | | |
|---|---|---|
| CN | 103839228 A | 6/2014 |
| CN | 103943025214-07 | 7/2014 |
| RU | 2254558 C2 | 6/2005 |

OTHER PUBLICATIONS

International Search Report for PCT/IB2015/050102; May 1, 2015; Shane Thomas.

*Primary Examiner* — Gertrude Arthur Jeanglaud
(74) *Attorney, Agent, or Firm* — BCF LLP

(57) ABSTRACT

There is disclosed a method executable by an electronic device for displaying a position on a map. The method comprises appreciating coordinates of position; appreciating coordinates of a map object having a curve near position; identifying a point of curve nearest to position comprising identifying a first segment of curve bounded by a first region and a second segment of curve bounded by a second region, determining that a distance from position to a point of first segment is not greater than a distance from position to a known nearest point of second region, and calculating a shortest distance from position to first segment as a shortest distance from position to either of first segment and second segment without calculating a distance from position to at least one point of second segment other than known nearest point of second region; and causing displaying, on map, of an indication of point of curve nearest to position.

20 Claims, 11 Drawing Sheets

(51) Int. Cl.
  *G01C 21/30*  (2006.01)
  *G01C 21/32*  (2006.01)

(56) References Cited

U.S. PATENT DOCUMENTS

| | | | |
|---|---|---|---|
| 6,111,588 A * | 8/2000 | Newell | G06T 11/20 345/440 |
| 6,366,927 B1 * | 4/2002 | Meek | G01C 21/32 345/442 |
| 7,002,578 B1 | 2/2006 | Ritter | |
| 8,359,156 B2 | 1/2013 | Guo et al. | |
| 8,379,025 B1 | 2/2013 | Carr et al. | |
| 2005/0116955 A1 * | 6/2005 | Cao | G06T 11/40 345/441 |
| 2011/0246055 A1 | 10/2011 | Huck et al. | |
| 2014/0095062 A1 | 4/2014 | Wang et al. | |

* cited by examiner

METHOD FOR DISPLAYING A POSITION ON A MAP

CROSS-REFERENCE

The present application claims priority to Russian Patent Application No. 2014126767, filed Jun. 30, 2014, entitled "METHOD FOR DISPLAYING A POSITION ON A MAP" the entirety of which is incorporated herein. The present application is a continuation of International Patent Application no. PCT/IB2015/050102, filed on Jan. 6, 2015, entitled "METHOD FOR DISPLAYING A POSITION ON A MAP", the entirety of which is incorporated herein by reference.

FIELD

The present technology relates to methods for displaying a position on a map comprising identifying a point of a curve nearest to the position.

BACKGROUND

Mapping applications executed by electronic devices such as desktop computers and smartphones display maps to users in order to provide useful geographic information. In some cases, such geographical information may include an indication of a nearest point of a map object to a position. For example, a user of a smartphone who wants to catch a glimpse of a parade may use a mapping application to locate a nearest point along the parade route. The mapping application may obtain a position of the smartphone via a positioning component, download information concerning the parade route via a networking component, calculate which point along the parade route is nearest to the position, and display an indication of the calculated point to the user.

Conventional methods for identifying a point of a curve nearest to a position generally involve calculating a distance from the position to each point of the curve, then identifying the point of the curve having the smallest distance to the position. While such methods are suitable in some instances, particularly when the curve does not comprise many points, in some instances they can be computationally intensive and demand a significant amount of computing resources.

There is therefore a need for improvements to methods for displaying a position on a map comprising identifying a point of a curve nearest to the position.

SUMMARY

The present technology provides computer-implemented methods and program instructions wherein one or more points of a curve are ruled out as candidates for nearest point of the curve to a position without calculating how far they actually are from the position. As a consequence, the computational task of calculating the distance to each one of the eliminated candidate points of the curve is obviated, which may result in a reduced usage of computational resources in some cases.

Thus, in one aspect, various implementations of the present technology provide a computer-implemented method for displaying a position on a map, the method executable by an electronic device causing displaying of the map, the method comprising:
  appreciating coordinates of the position;
  appreciating coordinates of a map object having a curve near the position;
  identifying a point of the curve nearest to the position, said identifying comprising
    identifying a first segment of the curve bounded by a first region and a second segment of the curve bounded by a second region;
    determining that a distance from the position to a point of the first segment is not greater than a distance from the position to a known nearest point of the second region; and
    calculating a shortest distance from the position to the first segment as a shortest distance from the position to either of the first segment and the second segment without calculating a distance from the position to at least one point of the second segment other than the known nearest point of the second region; and
  causing displaying, on the map, of an indication of the point of the curve nearest to the position.

In some implementations, identifying the first segment of the curve bounded by the first region and the second segment of the curve bounded by the second region comprises dividing the curve into monotonic segments including the first segment and the second segment.

In some implementations, identifying the first segment of the curve bounded by the first region and the second segment of the curve bounded by the second region comprises dividing a monotonic segment of the curve into segments including the first segment and the second segment. In some such implementations, dividing the monotonic segment of the curve into segments including the first segment and the second segment comprises dividing the monotonic segment of the curve into an odd number of segments, the first segment being a middle one of the odd number of segments. In some such implementations, dividing the monotonic segment of the curve into segments including the first segment and the second segment comprises dividing the monotonic segment of the curve into segments including the first segment and the second segment such that the second segment monotonically progresses away from the position from a known nearest point of the second region. In some such implementations, dividing the monotonic segment of the curve into segments including the first segment and the second segment comprises dividing the monotonic segment of the curve into segments including the first segment, the second segment, and a third segment bounded by a third region, such that the third segment monotonically progresses away from the position from a known nearest point of the third region; and identifying the point of the curve nearest to the position further comprises calculating a distance from the position to the known nearest point of the third region as a shortest distance from the position to the third segment without calculating a distance from the position to at least one point of the third segment other than the known nearest point of the third region.

In some implementations, determining that the distance from the position to the point of the first segment is not greater than the distance from the position to the known nearest point of the second region comprises determining that a distance from the position to a known farthest point of the first region is not greater than the second distance. In some such implementations, the map is three-dimensional, the first region is a rectangular cuboid, and the known farthest point of the first region is a farthest corner of the first region. In other such implementations, the map is two-dimensional, the first region is a rectangle, and the known farthest point of the first region is a farthest corner of the first region.

In some implementations, the map is three-dimensional, the second region is a rectangular cuboid, and the known nearest point of the second region is a nearest corner of the second region. In other such implementations, the map is two-dimensional, the second region is a rectangle, and the known nearest point of the second region is a nearest corner of the second region.

In some implementations, calculating a shortest distance from the position to the first segment as a shortest distance from the position to either of the first segment and the second segment without calculating a distance from the position to at least one point of the second segment other than the known nearest point of the second region is calculating a shortest distance from the position to the first segment as a shortest distance from the position to either of the first segment and the second segment without calculating a distance from the position to any point of the second segment other than the known nearest point of the second region.

In another aspect, various implementations of the present technology provide a computer-implemented method for displaying a position on a map, the method executable by an electronic device causing displaying of the map, the method comprising:

appreciating coordinates of the position;
appreciating coordinates of an object having a curve near the position;
identifying a point of the curve nearest to the position, said identifying comprising
   identifying a monotonic segment of the curve bounded by a region having a known nearest point to the position;
   determining that the monotonic segment monotonically progresses away from the position from the known nearest point;
   calculating a distance from the position to the known nearest point of the region as a shortest distance from the position to the monotonic segment without calculating a distance from the position to at least one point of the monotonic segment other than the known nearest point of the region; and
causing displaying, on the map, of an indication of the point of the curve nearest to the position.

In some implementations, the map is three-dimensional, the region is a rectangular cuboid, and the known nearest point of the region is a nearest corner of the region. In other implementations, the map is two-dimensional, the region is a rectangle, and the known nearest point of the region is a nearest corner of the region.

In some implementations, calculating a distance from the position to the known nearest point of the region as a shortest distance from the position to the monotonic segment without calculating a distance from the position to at least one point of the monotonic segment other than the known nearest point of the region is calculating a distance from the position to the known nearest point of the region as a shortest distance from the position to the monotonic segment without calculating a distance from the position to any point of the monotonic segment other than the known nearest point of the region.

In other aspects, various implementations of the present technology provide a non-transitory computer-readable medium storing program instructions for displaying a position on a map, the program instructions being executable by one or more processors of an electronic device to carry out one or more of the above-recited methods.

In the context of the present specification, unless expressly provided otherwise, an "electronic device" is any hardware and/or software appropriate to the relevant task at hand. Thus, some non-limiting examples of electronic devices include computers (servers, desktops, laptops, netbooks, etc.), smartphones, and tablets, as well as network equipment such as routers, switches, and gateways.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular filesystem, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
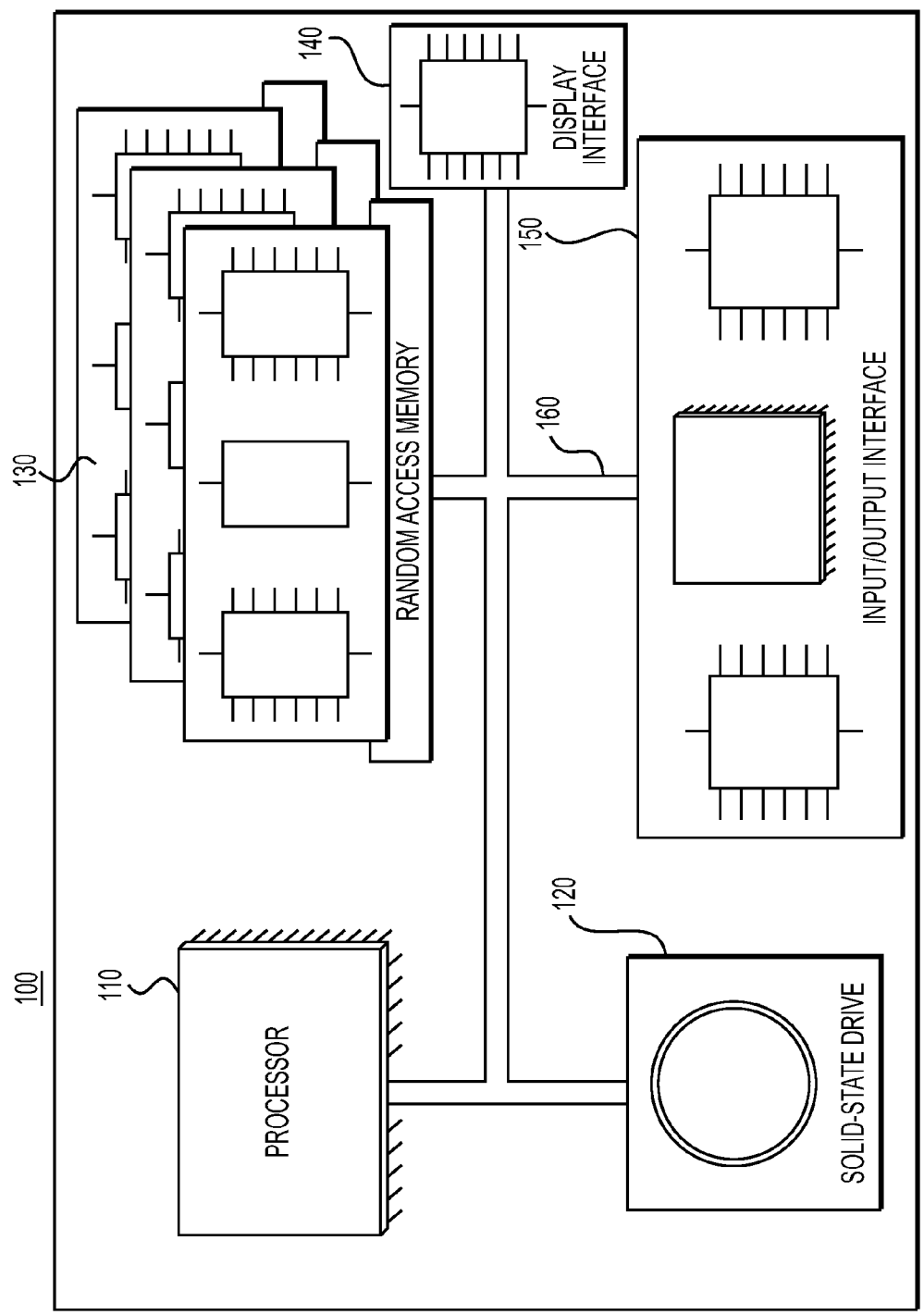
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150. Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor or touchscreen (not shown). According to implementations of the present technology, the solid-state drive 120 stores program instructions suitable for being loaded into the random access memory 130 and executed by the processor 110 for displaying a position on a map. For example, the program instructions may be part of a mapping application executable by the processor 110.

Figure 2:
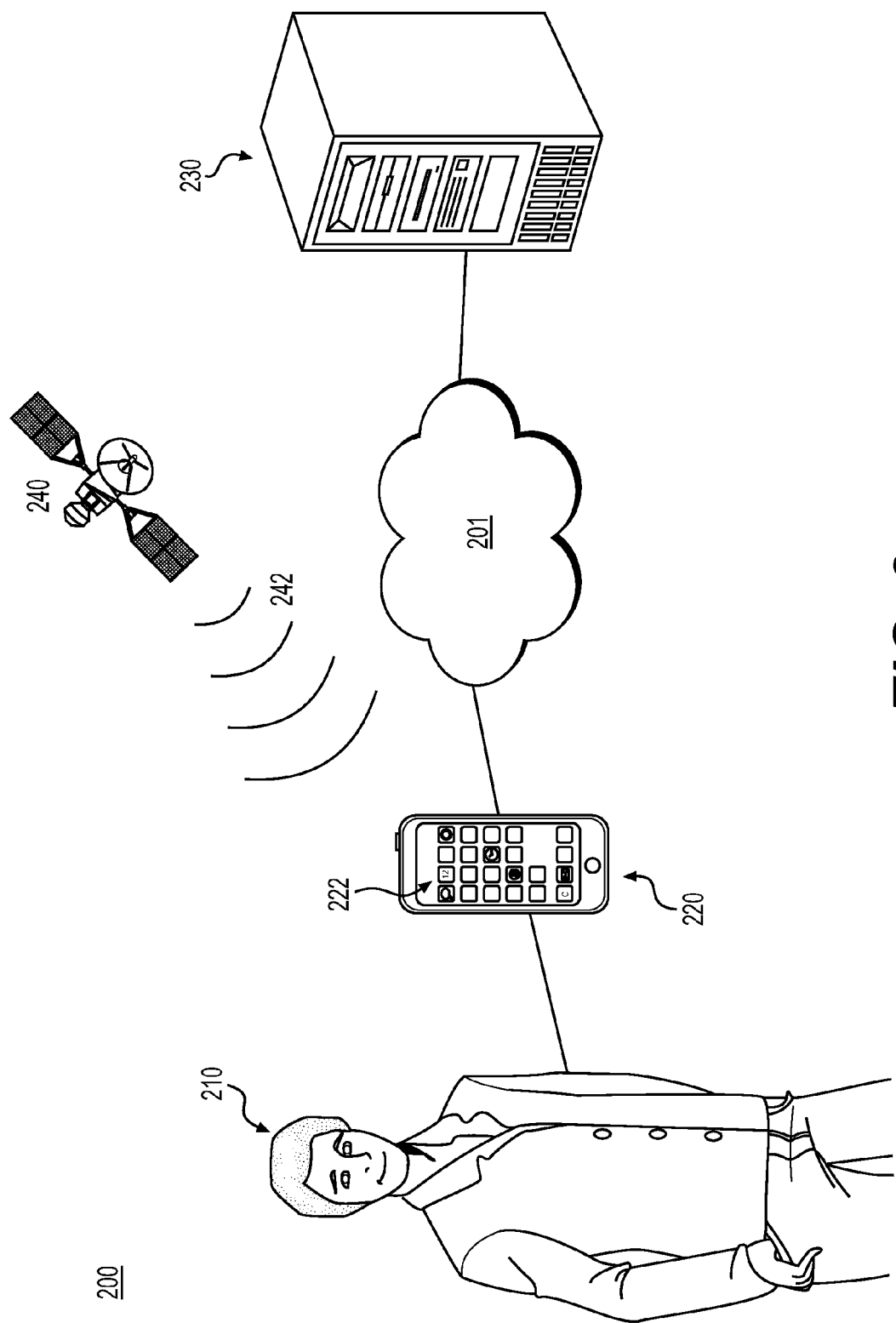
FIG. 2 is a diagram of a networked computing environment suitable for use with some implementations of the present technology.

In FIG. 2, there is shown a networked computing environment 200 suitable for use with some implementations of the present technology, the networked computing environment 200 comprising a smartphone 220 (e.g. an Apple iPhone™ or a Samsung Galaxy S4™) with a touchscreen 222 for displaying information to a user 210 and receiving touchscreen commands from the user 210, a mapping server 230 in communication with the smartphone 220 via a communications network 201 (e.g. the Internet), and a GPS satellite 240 transmitting a GPS signal 242 to the smartphone 220. Along with touchscreen 222, smartphone 220 also comprises internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the mapping server 320 via communications network 201 and a GPS receiver (not depicted) for receiving the GPS signal 242 from GPS satellite 240. It will be understood that other implementations of the present technology may employ a positioning technology other than GPS.

Figure 3:
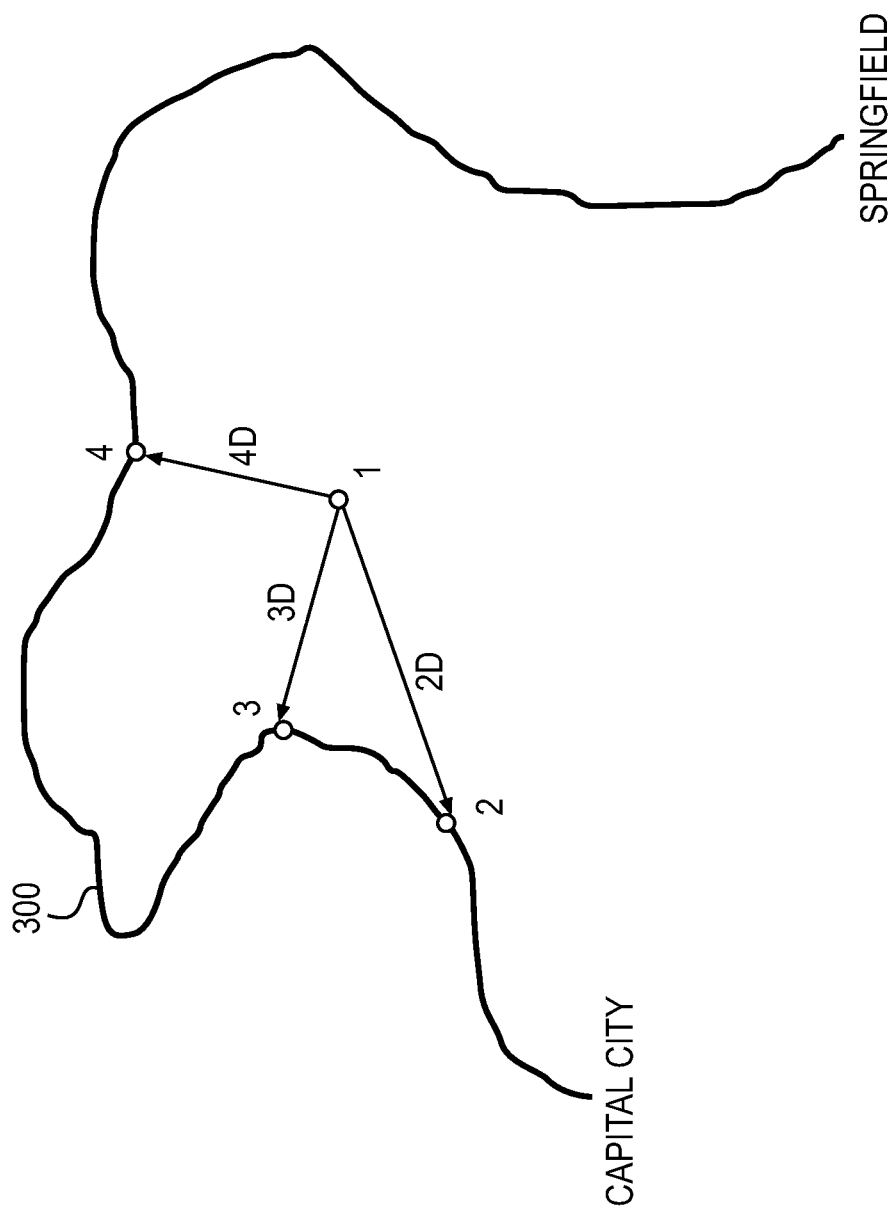
FIG. 3 is a diagram of a position and a curve illustrating implementations of the present technology.

FIG. 3 shows a route 300 from Capital City to Springfield which may be received by the smartphone 220 from the mapping server 230 via communications network 201, and a GPS position 1 of smartphone 220 which may be received by the smartphone 220 from the GPS satellite 240 by way of the GPS signal 242, according to an exemplary implementation of the present technology. It may be useful for a mapping application executed by the processor 110 of the smartphone 220 to carry out the steps of appreciating the route 300 having been received from the mapping server 230, appreciating the GPS position 1 having been received from the GPS satellite 240, identifying a point of the route 300 nearest to the GPS position 1 (e.g. one of the candidate points 2, 3, and 4 shown in FIG. 3, lying at respective distances of 2D, 3D, and 4D from GPS position 1), and providing an indication of the nearest point to the user 210 of the smartphone 220.

As a first example, the mapping application may be reasonably confident (perhaps due to specific input received from the user 210) that the correct position of the smartphone 220 must lie on the route 300, even though the GPS position 1 of smartphone 220 received from the GPS satellite 240 does not lie on the route 300. For example, the user 210 may have requested the mapping application to determine the route 300 and display the route to the user 300. In such case, the mapping application may identify a nearest point of the route 300 to the GPS position 1 as a best estimate of the actual correct position of the smartphone 220 and cause that nearest point of the route 300 to be displayed to the user 210 on a map.

As a second example, the route 300 may be an official cycling trail from Capital City to Springfield, and the user 210 of the smartphone 220 at GPS position 1 (this time assumed to be correct) may be a cyclist having deviated from the official cycling trail. In such case, the user 210 may request assistance from the mapping application to get back to the official cycling trail, causing the mapping application to identify the nearest point of route 300 and display it to the user 210 on the touchscreen 222 of the smartphone 220.

As those skilled in the art will readily understand, implementations of the present technology may also be employed in many other scenarios.

Figure 4:
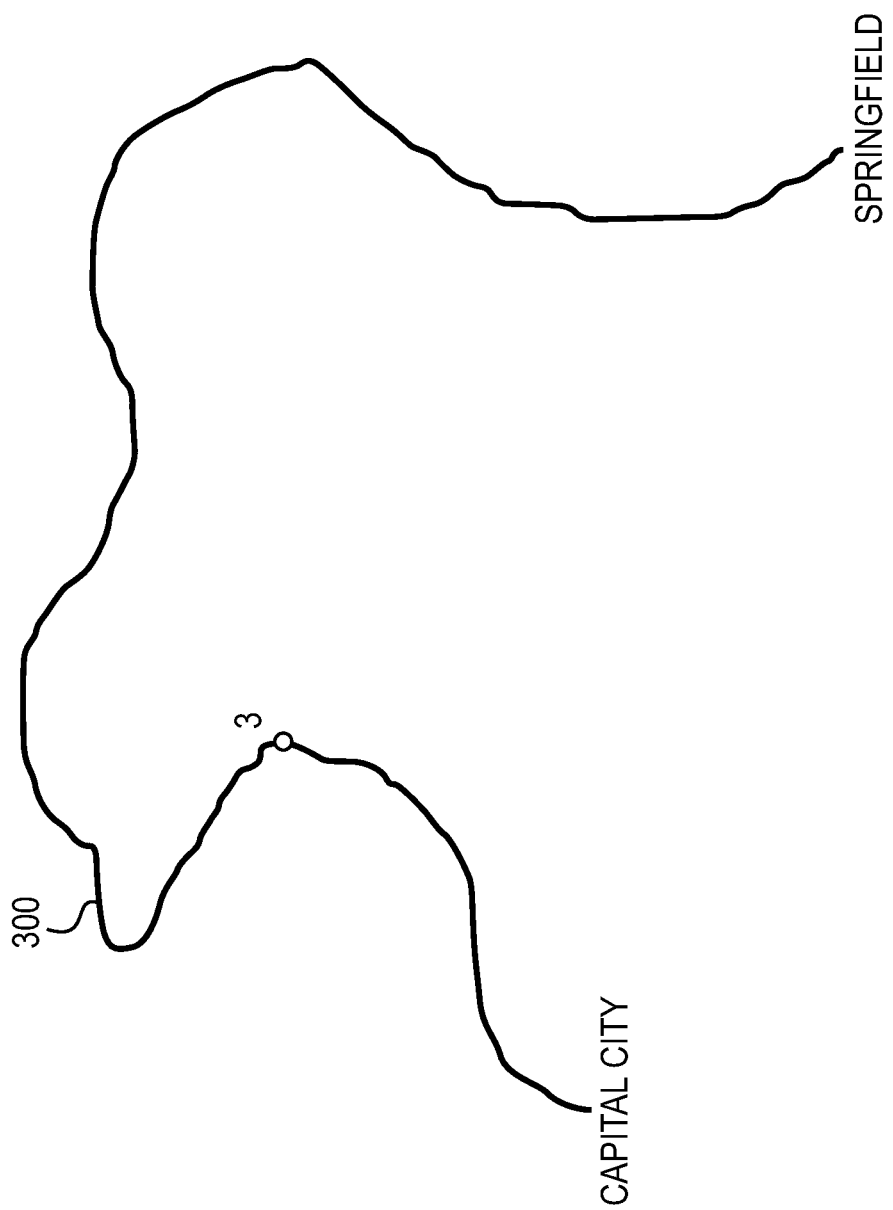
FIGS. 4 and 5 are screenshots of a map which may be displayed by a mapping application according to some implementations of the present technology.
Figure 5:
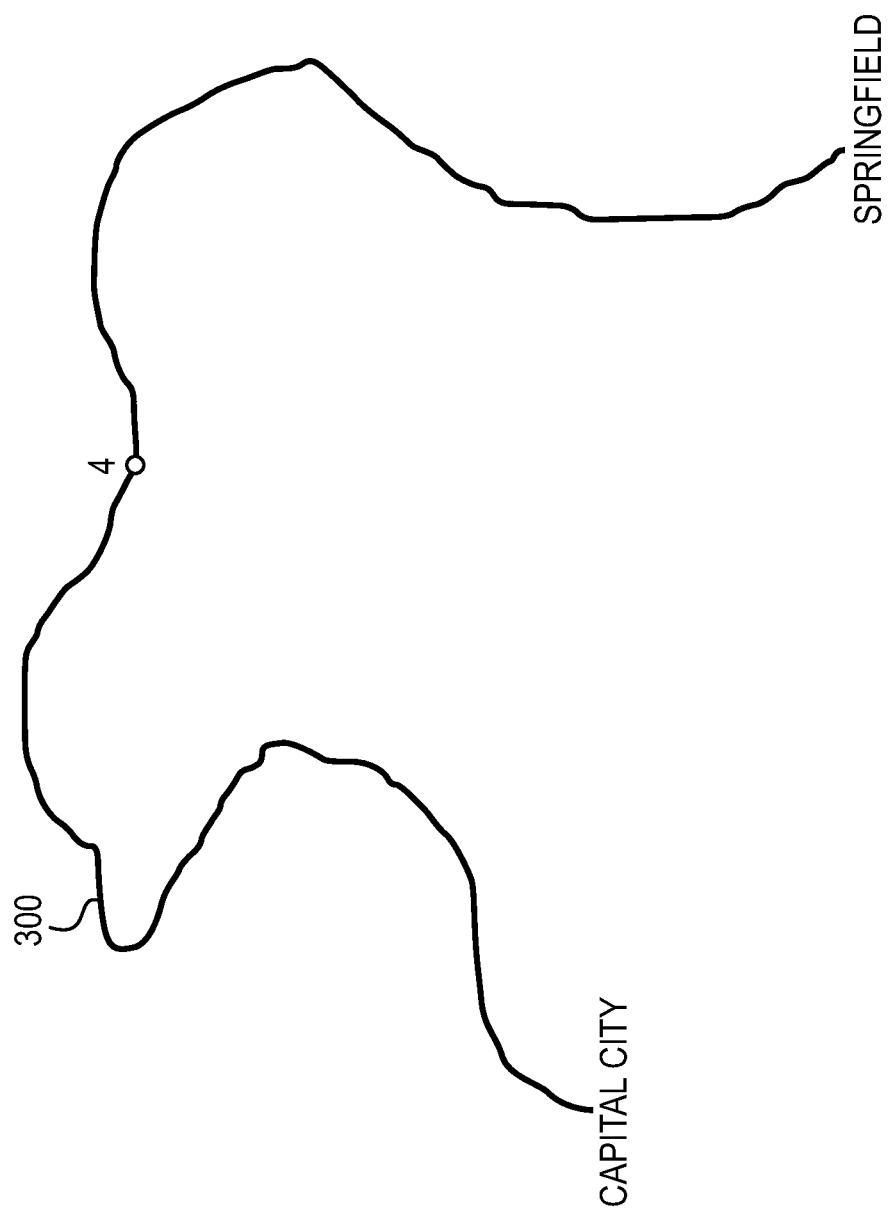

FIG. 4 and FIG. 5 show two alternative screenshots which may be displayed to the user 210 depending on which of candidate point 3 and candidate point 4 of the route 300—among all of the other candidate points of the route 300 not depicted—is identified by the mapping application as the point of the route 300 nearest to the GPS position 1.

In FIG. 4, candidate point 3, at distance 3D from the GPS position 1, is indicated as the nearest point by way of a small circle drawn on the route 300. FIG. 5 shows how the mapping application may indicate to the user 210 an alternative conclusion, namely that candidate point 4, at distance 4, is the nearest point on the route 300 to the GPS position 1.

Having briefly described some of the potential applications of the present technology, we shall now describe, with reference to FIG. 6 to FIG. 9, manners in which the present technology enables identifying a point of a curve nearest to a position without calculating how far every one of the points of the curve is from the position.

Figure 6:
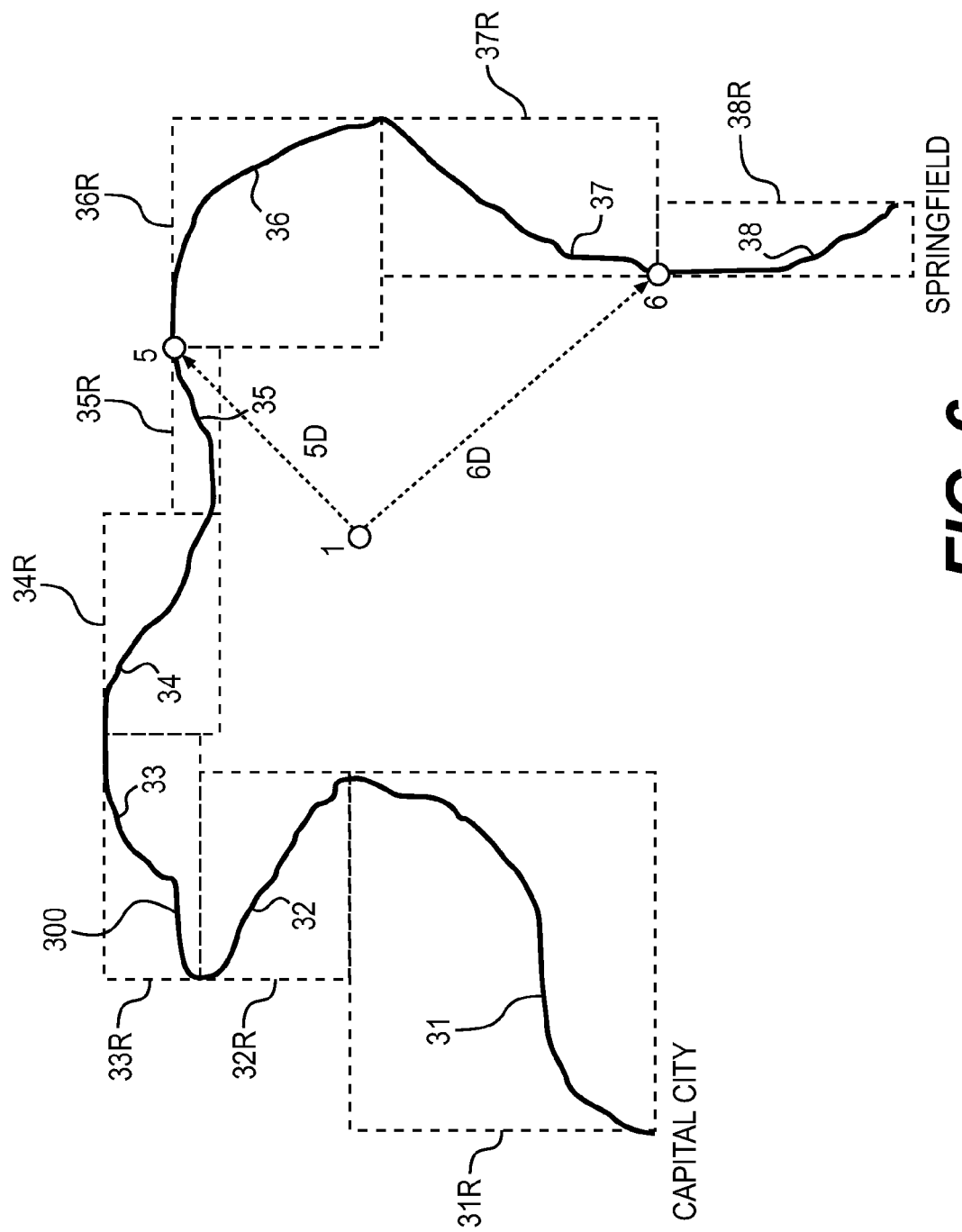
FIGS. 6 to 8 are diagrams of a position and a curve divided into monotonic segments illustrating implementations of the present technology.

FIG. 6 shows the route 300 having been divided into eight segments 31 to 38, each bounded by a respective region 31R to 38R. Each of the segments 31 to 38 is said to be "monotonic" because it is either entirely non-increasing or entirely non-decreasing in each dimension.

For example, analyzed from left to right, monotonic segments 31, 33, 35, and 37 never decrease in the horizontal dimension (x-dimension), and they also never decrease in the vertical dimension (y-dimension). Conversely, monotonic segments 32, 34, 36, and 38 never increase either in the x-dimension or the y-dimension. A monotonic segment may nonetheless have a flat portion such that it neither increases nor decreases in one or more dimensions, so long as it does not both increase and decrease in any dimension.

It should be noted that while the regions 31R to 38R shown in FIG. 6 are rectangles, regions having other shapes (such as circles) are also contemplated by the present technology. Notably, if the map is three-dimensional, the regions bounding various segments of the curve represented by an object such as route 300 may also be three-dimensional, perhaps taking the form of a rectangular cuboid (box) or a sphere, as non-limiting examples. While irregular shapes may be used, it is embodiments of the present technology contemplate selecting a shape that allows boundary points of the regions to be known without undue computation. In particular, some implementations of the present technology involve the nearest and/or farthest points of the regions to be readily known, as will become clear below.

Along with a division of the route 300 into regions 31R to 38 R, FIG. 6 also shows a first manner in which implementations of the present technology may avoid calculating the distance to some of the candidate points of the route 300. Consider, first, that a farthest point of the region 35R, namely that which coincides with candidate point 5 of the route 300, lies at distance 5D from the GPS position 1. Next, observe that a nearest point of the region 38R, namely that which coincides with candidate point 6 of the route 300, lies at a greater distance 6D than distance 5D from the GPS position 1. Because no point in the region 38R may be nearer to the GPS position 1 than candidate point 6, some implementations of the present technology may therefore soundly conclude, without calculating the distance from GPS position 1 to any other candidate point of segment 38 of the route 300, that the nearest point to GPS position 1 of either segment 35 or segment 38 is the nearest point of segment 35 and not the nearest point of segment 38.

Put otherwise, implementations of the present technology may conclude that the shortest distance from the GPS position 1 to the segment 35 is the shortest distance from the GPS position 1 to either of the segment 35 and the segment 38.

Figure 7:
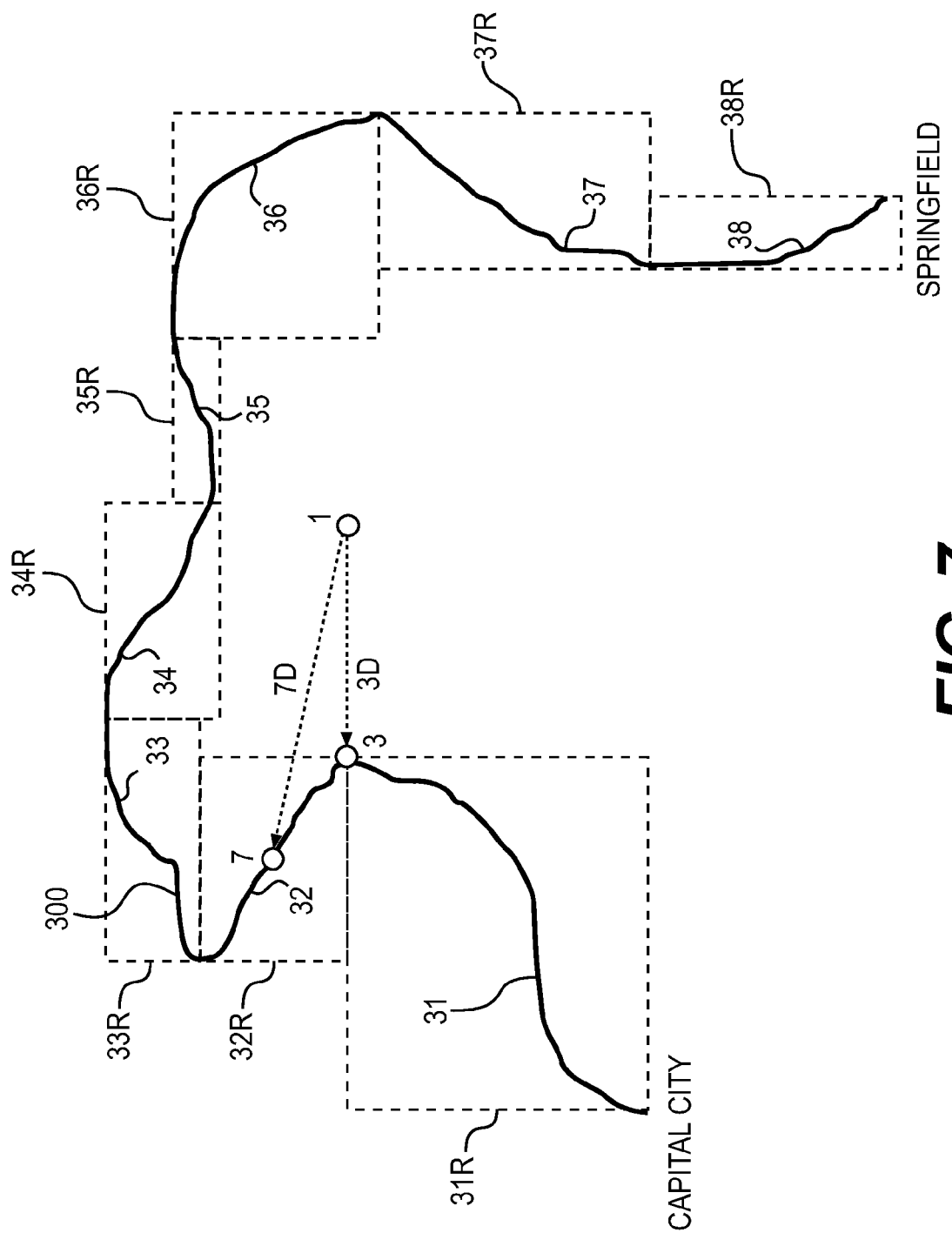

FIG. 7 shows a second manner in which implementations of the present technology may avoid calculating the distance to some of the candidate points of the route 300. Consider the segment 32, bounded by the region 32R, which monotonically progresses away from GPS position 1 from a known nearest point of the region 32R to the GPS position 1, namely candidate point 3 of the route 300. Because it is impossible that any candidate point (e.g. candidate point 7) of the segment 32 is nearer to the GPS position 1 than candidate point 3, implementations of the present technology may therefore soundly conclude without calculating the distance from GPS position 1 to any other candidate point of segment 32 of the route 300, that the shortest distance from GPS position 1 to segment 32 is the distance from GPS position 1 to candidate point 3.

Figure 8:
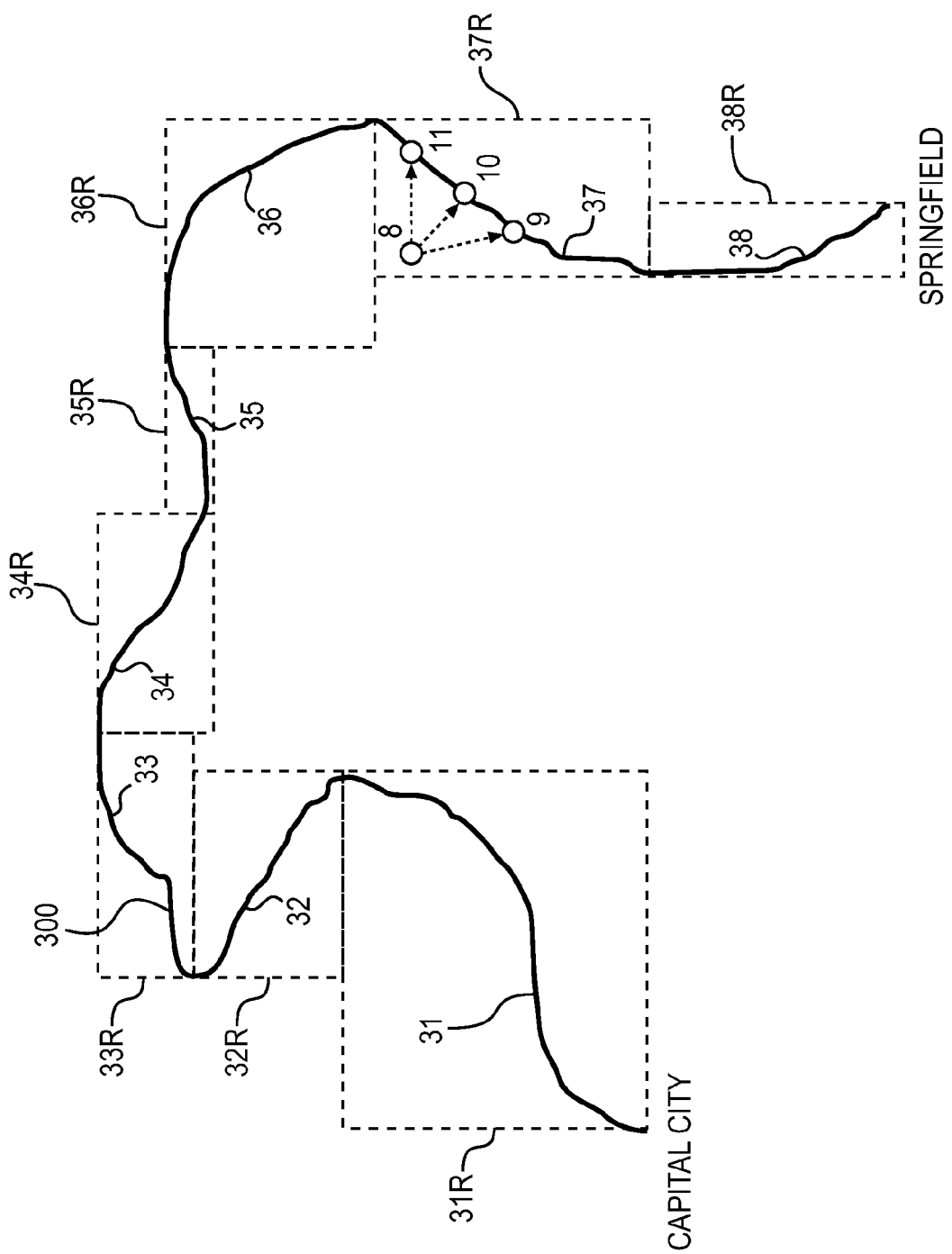

FIG. 8 resembles FIG. 7, only it shows a different GPS position 8, this time located within the region 37R which bounds the monotonic segment 37 of the route 300 between Capital City and Springfield. As such, it represents another instance of the same problem presented above with reference to FIG. 3 to FIG. 7, namely that of identifying a point of the route 300 nearest to a GPS position 8. Candidate points 9, 10, and 11 are shown merely as examples of points of the route 300 which may be found to be the nearest point.

Figure 9:
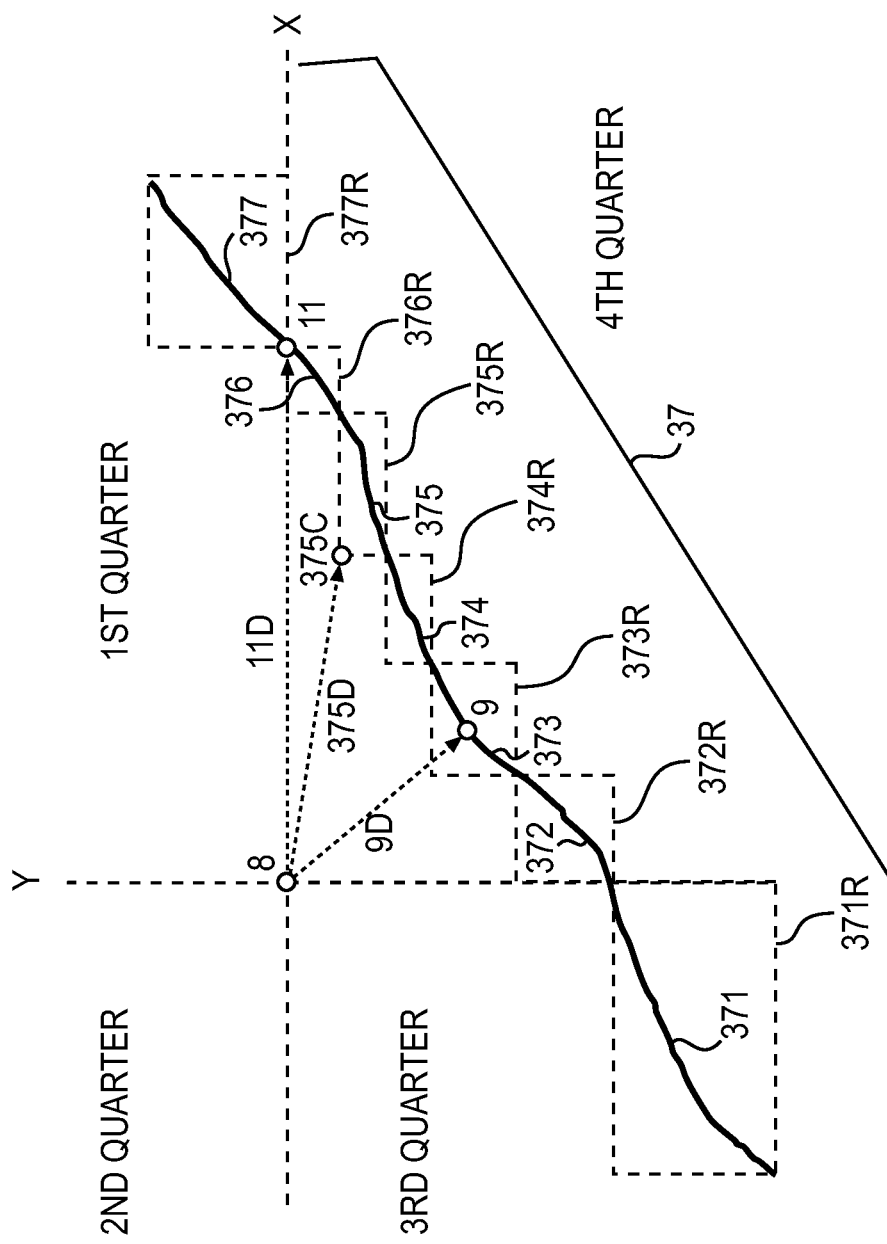
FIG. 9 is a diagram of a position and a monotonic segment divided into segments illustrating implementations of the present technology.

FIG. 9 shows a close-up view (not to scale) of the monotonic segment 37 of FIG. 8, along with GPS position 8 and candidate points 9 and 11, with a view to illustrating further techniques of the present technology. The monotonic segment 37 has been further divided into segments 371 to 377 each bounded by a respective region 371R to 377R. Being segments of a monotonic segment 37, each of the segments 371 to 377 are necessarily monotonic themselves. According to the implementation shown, the regions 371R to 377R are rectangular, but as previously described, in other implementations they may have other shapes such as circles (or rectangular cuboids, spheres, or other three-dimensional forms in the case of three-dimensional implementations of the present technology).

Segment 377 (bounded by region 377R) lies entirely within a $1^{st}$ Cartesian quarter relative to the GPS position 8, meaning that every point of the segment 377 has greater (or equal) coordinate values than those of the GPS position 8 in each of the x-dimension and the y-dimension. As such, segment 377 presents a situation analogous to that of segment 32 in FIG. 7, in that segment 377 monotonically progresses away from GPS position 8 from a nearest corner (represented by candidate point 11) of the region 377R.

Implementations of the present technology may therefore soundly conclude that the shortest distance to any point of the segment 377 is the distance 11D to the known nearest corner (candidate point 11) of the region 377R. Similarly, segment 371 (bounded by region 377R) lies entirely within a $3^{rd}$ Cartesian quarter relative to the GPS position 8, meaning that every point of the segment 371 has lesser (or equal) coordinate values than those of the GPS position 8 in each of the x-dimension and the y-dimension, and the shortest distance from the GPS position 8 to the segment 377 is therefore known to be the distance to the nearest corner (unlabeled) of the region 371R Indeed, some implementations of the present technology may divide a monotonic segment which lies both in the $4^{th}$ Cartesian quarter (or, analogously, the $2^{nd}$ Cartesian quarter) and in one or both of the $1^{st}$ and $3^{rd}$ Cartesian quarters, into segments including a segment lying entirely within one of the $1^{st}$ and $3^{rd}$ Cartesian quarters, for the specific purpose of eliminating any candidate points of that segment other than a known nearest point of the region bounding that segment.

The situation is different for the remainder of the segments (372 to 376), which lie in a $4^{th}$ Cartesian quarter relative to the GPS position 8, such that every point of the segments 372 to 376 has a greater (or equal) coordinate value in the x-dimension but a lesser (or equal) coordinate value in the y-dimension than the GPS position 8. In such case, given that the segments 372 to 376 monotonically increase in both the x-dimension and the y-dimension, the nearest corner of a region in the $4^{th}$ Cartesian quarter will not likely intersect the segment which it bounds (the exception being a segment that exactly traces the nearest contour of the region in question to the position in question).

For example, the nearest corner 375C of the region 375R is not a point of the segment 375, and is therefore not a candidate point in the way that candidate point 11 was as a nearest corner of the region 377R lying in the $1^{st}$ Cartesian quarter. Nevertheless, because the nearest corner 375C is a nearest point to any point of the region 375R which bounds segment 375, the distance 375D from GPS position 8 to the nearest corner 375C serves as an absolute lower bound on the distance from GPS position 8 to any point of the segment 375.

As such, the need to calculate the actual distance to any of the points of the segment 375 is eliminated as soon as a shorter distance than distance 375D to another candidate point of the segment 37 becomes known. For example, once the distance 9D from GPS position 8 to candidate point 9 of segment 373 is determined to be less than or equal to distance 375D, implementations of the present technology may soundly conclude that a shortest distance from the GPS position 8 to segment 373 is a shortest distance to either one of segment 373 and segment 375, without ever calculating the distance from GPS position 8 to any of the points of the segment 375.

The inventor of the present technology has observed that in some embodiments of the present technology one may divide the portion of the monotonic segment (e.g. segment 37) lying within the $4^{th}$ quarter (or, analogously, the $2^{nd}$ quarter) into an odd number of segments (e.g. the five segments 372 to 376), and to select the middle one of the segments (e.g. segment 374) as a most likely segment to include the nearest point to the position (GPS position 8, in this case).

Figure 10:
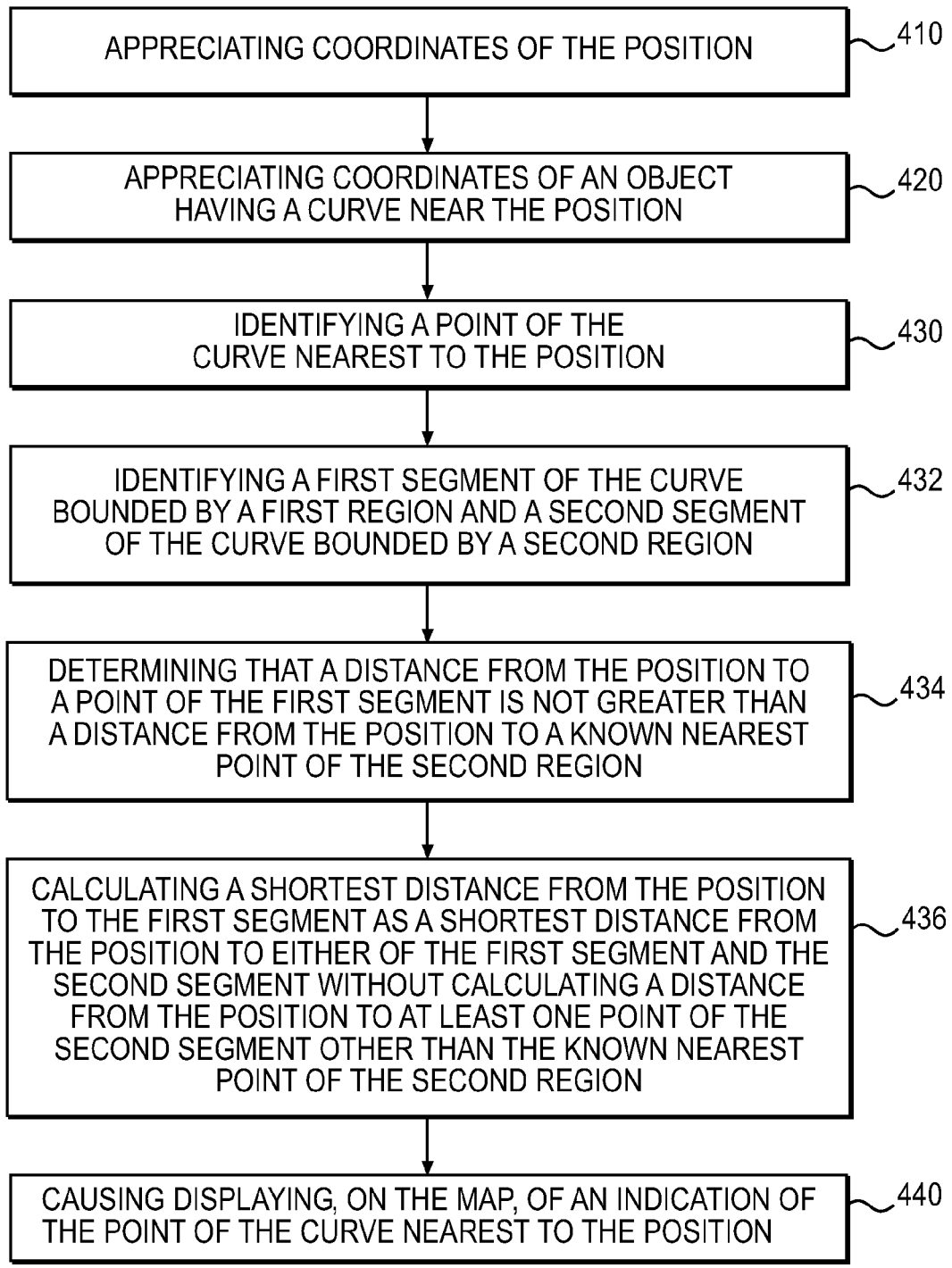
FIGS. 10 and 11 are flowcharts illustrating the respective steps of two method implementations of the present technology.

With reference now to FIG. 10, a flowchart corresponding to an exemplary method implementation of the present technology is shown. More specifically, FIG. 10 shows a computer-implemented method 400 for displaying a position on a map, the method executable by a processor of an electronic device.

Method 400 may be carried out, for example, in the context of the smartphone 220 of FIG. 2 by a processor 110 executing program instructions having been loaded into its random access memory 130.

At step 410, coordinates of the position are appreciated. For example, the coordinates of GPS position 8 may be received from a GPS satellite 240 via a GPS signal 242 or read by the processor 110 of smartphone 220 from its memory 120.

At step 420, coordinates of an object having a curve near the position are appreciated. For example, coordinates of the route 300 having, among other curves, a segment 37 near the GPS position 8 of FIG. 9, may be received by the smartphone 220 from the mapping server 230 via the communications network 201.

At step 430, a point of the curve nearest to the position is identified. For example, the candidate point 9 of segment 37 of FIG. 9 may be identified as the point of segment 37 nearest to the GPS position 8.

Step 430 comprises step 432, wherein a first segment of the curve bounded by a first region and a second segment of the curve bounded by a second region are identified. For example, segment 373 bounded by region 373R and segment 375 bounded by segment 375R may be identified.

In some implementations, the curve may be divided into monotonic segments including the first segment and the second segment. For example, the route 300 may be divided into monotonic segments 31 to 38, as in FIG. 6, or a monotonic segment 37 may be divided into segments 371 to 377, as in FIG. 9.

Step 430 also comprises step 434, wherein it is determined that a distance from the position to a point of the first segment is not greater than a distance from the position to a known nearest point of the second region. For example, it may be determined that the distance 9D to candidate point 9 is less than the distance 375D to the nearest corner 375C of the region 375R. In some implementations, it may be determined that a farthest point of the first region is at least as near as the nearest point of the second region, such as was the case in the example provided above with reference to FIG. 6.

Step 430 also comprises step 436, wherein a shortest distance from the position to the first segment is calculated as a shortest distance from the position to either of the first segment and the second segment without calculating a distance from the position to at least one point of the second segment other than the known nearest point of the second region. For example, the shortest distance from the GPS position 8 to the segment 373 may be calculated as the shortest distance from the GPS position 8 to either of the segment 373 and the segment 375 without calculating a distance to one or more (or any) of the points of the segment 375.

Finally, at step 440, displaying on the map of an indication of the point of the curve nearest to the position is caused. For example, the processor 110 of the smartphone 220 may cause the display interface 140 of the smartphone 220 to display the point on a map displayed on touchscreen 222, thus providing the user 210 of the smartphone 220 with an indication of the point (candidate point 9) of the route 300 nearest to his or her GPS position 8.

Figure 11:
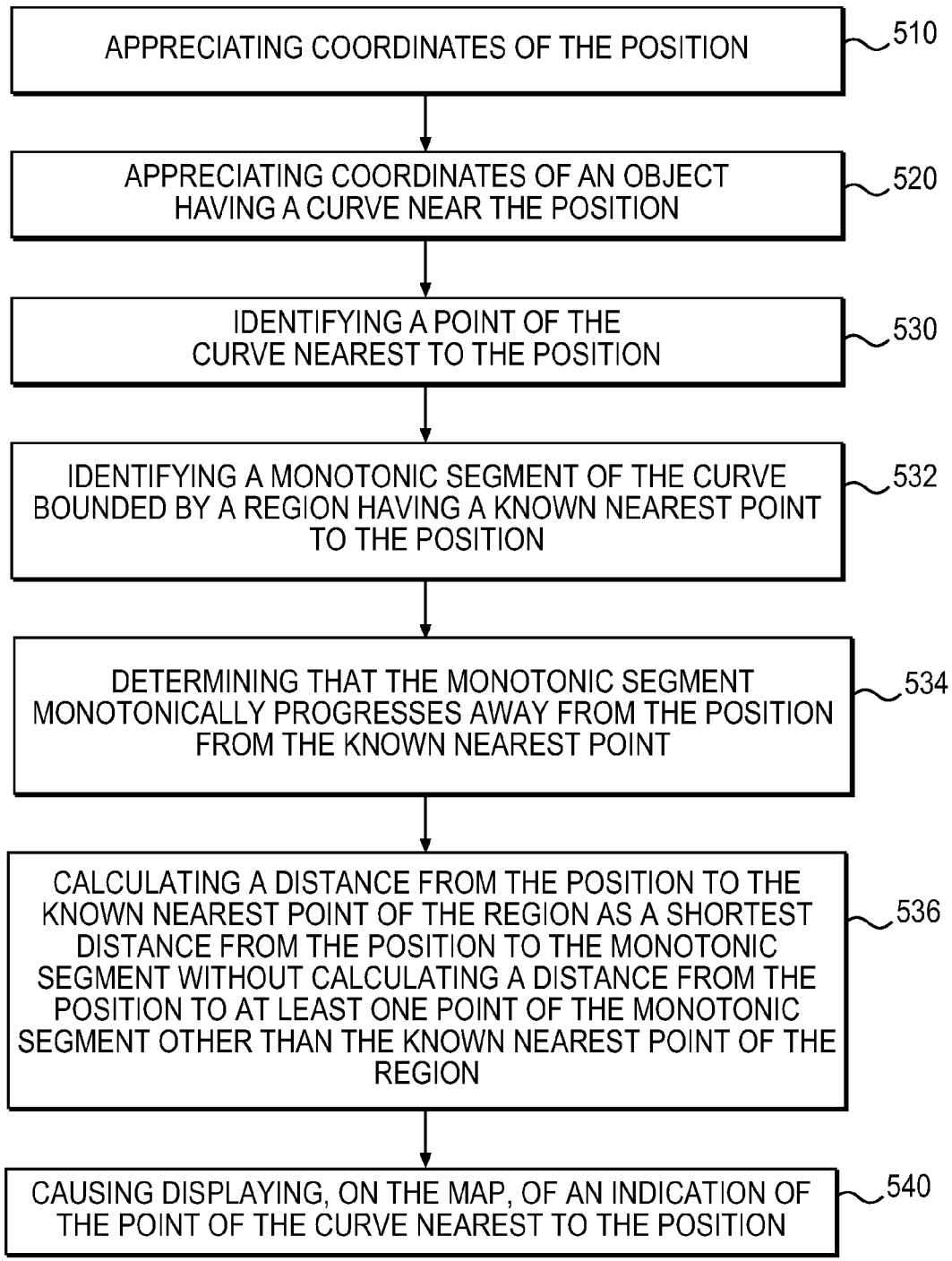

With reference now to FIG. 11, a flowchart corresponding to an exemplary method implementation of the present technology is shown. More specifically, FIG. 11 shows a computer-implemented method 500 for displaying a position on a map, the method executable by a processor of an electronic device. Method 500 may be carried out, for example, in the context of the smartphone 220 of FIG. 2 by a processor 110 executing program instructions having been loaded into its random access memory 130.

At step 510, coordinates of the position are appreciated. For example, the coordinates of GPS position 8 may be received from a GPS satellite 240 via a GPS signal 242 or read by the processor 110 of smartphone 220 from its memory 120. At step 520, coordinates of an object having a curve near the position are appreciated. For example, coordinates of the route 300 having, among other curves, a segment 37 near the GPS position 8 of FIG. 9, may be received by the smartphone 220 from the mapping server 230 via the communications network 201.

At step 530, a point of the curve nearest to the position is identified. For example, the candidate point 9 of segment 37 of FIG. 9 may be identified as the point of segment 37 nearest to the GPS position 8.

Step 530 comprises step 532, wherein a monotonic segment of the curve bounded by a region having a known nearest point to the position is identified. For example, segment 377 bounded by region 377R having the known nearest corner coincident with candidate point 11 may be identified.

Step 530 also comprises step 534, wherein it is determined that the monotonic segment monotonically progresses away from the position from the known nearest point. For example, it may be determined that segment 377 is a monotonic segment which, from a known nearest point (the candidate point 11) of region 377R, candidate point 11 having greater coordinate values in both the x-dimension and y-dimension than the GPS position 8, monotonically progresses to other points of the segment 377 having yet greater (or equal) coordinate values than those of candidate point 11.

Step 530 also comprises step 536, wherein a distance from the position to the known nearest point of the region is calculated as a shortest distance from the position to the monotonic segment without calculating a distance from the position to at least one point of the monotonic segment other than the known nearest point of the region. For example, the distance 11D from GPS position 8 to the candidate point 11 of region 377R may be calculated as the shortest distance from GPS position 8 to one or more (or any) point of segment 377.

Finally, at step 540, displaying on the map of an indication of the point of the curve nearest to the position is caused. For example, the processor 110 of the smartphone 220 may cause the display interface 140 of the smartphone 220 to display the point on a map displayed on touchscreen 222, thus providing the user 210 of the smartphone 220 with an indication of the point (candidate point 9) of the route 300 nearest to his or her GPS position 8.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for displaying a position on a map, the method executable by an electronic device causing displaying of the map, the method comprising:
   appreciating coordinates of the position;
   appreciating coordinates of an object having a curve near the position;
   identifying a point of the curve nearest to the position, said identifying comprising
      identifying a first segment of the curve bounded by a first region and a second segment of the curve bounded by a second region; wherein
      identifying the first segment of the curve bounded by the first region and the second segment of the curve bounded by the second region comprises dividing a monotonic segment of the curve into segments including the first segment and the second segment; and wherein
      dividing the monotonic segment of the curve into segments including the first segment and the second segment comprises dividing the monotonic segment of the curve into segments including the first segment and the second segment such that the second segment monotonically progresses away from the position from a known nearest point of the second region
   determining that a distance from the position to a point of the first segment is not greater than a distance from the position to a known nearest point of the second region; and
   calculating a shortest distance from the position to the first segment as a shortest distance from the position to either of the first segment and the second segment without calculating a distance from the position to at least one point of the second segment other than the known nearest point of the second region; and
   causing displaying, on the map, of an indication of the point of the curve nearest to the position.

2. The method of claim 1, wherein:
   dividing the monotonic segment of the curve into segments including the first segment and the second segment comprises dividing the monotonic segment of the curve into segments including the first segment, the second segment, and a third segment bounded by a third region, such that the third segment monotonically progresses away from the position from a known nearest point of the third region; and
   identifying the point of the curve nearest to the position further comprises calculating a distance from the position to the known nearest point of the third region as a shortest distance from the position to the third segment without calculating a distance from the position to at least one point of the third segment other than the known nearest point of the third region.

3. The method of claim 1, wherein determining that the distance from the position to the point of the first segment is not greater than the distance from the position to the known nearest point of the second region comprises determining that a distance from the position to a known farthest point of the first region is not greater than the second distance.

4. The method of claim 3, wherein the map is three-dimensional, the first region is a rectangular cuboid, and the known farthest point of the first region is a farthest corner of the first region.

5. The method of claim 3, wherein the map is two-dimensional, the first region is a rectangle, and the known farthest point of the first region is a farthest corner of the first region.

6. The method of claim 1, wherein the map is three-dimensional, the second region is a rectangular cuboid, and the known nearest point of the second region is a nearest corner of the second region.

7. A computer-implemented method for displaying a position on a map, the method executable by an electronic device causing displaying of the map, the method comprising:
  appreciating coordinates of the position;
  appreciating coordinates of an object having a curve near the position;
  identifying a point of the curve nearest to the position, said identifying comprising
    identifying a monotonic segment of the curve bounded by a region having a known nearest point to the position;
    determining that the monotonic segment monotonically progresses away from the position from the known nearest point;
    calculating a distance from the position to the known nearest point of the region as a shortest distance from the position to the monotonic segment without calculating a distance from the position to at least one point of the monotonic segment other than the known nearest point of the region; and
  causing displaying, on the map, of an indication of the point of the curve nearest to the position.

8. The method of claim 7, wherein the map is three-dimensional, the region is a rectangular cuboid, and the known nearest point of the region is a nearest corner of the region.

9. The method of claim 7, wherein the map is two-dimensional, the region is a rectangle, and the known nearest point of the region is a nearest corner of the region.

10. The method of claim 7, wherein calculating a distance from the position to the known nearest point of the region as a shortest distance from the position to the monotonic segment without calculating a distance from the position to at least one point of the monotonic segment other than the known nearest point of the region is calculating a distance from the position to the known nearest point of the region as a shortest distance from the position to the monotonic segment without calculating a distance from the position to any point of the monotonic segment other than the known nearest point of the region.

11. A non-transitory computer-readable medium storing program instructions for displaying a position on a map, the program instructions being executable by a processor of an electronic device to effect:
  appreciating of coordinates of the position;
  appreciating of coordinates of an object having a curve near the position;
  identifying of a point of the curve nearest to the position, said identifying comprising
    identifying of a first segment of the curve bounded by a first region and a second segment of the curve bounded by a second region; wherein
      identifying of the first segment of the curve bounded by the first region and the second segment of the curve bounded by the second region comprises dividing of a monotonic segment of the curve into segments including the first segment and the second segment; wherein
        dividing of the monotonic segment of the curve into segments including the first segment and the second segment comprises dividing of the monotonic segment of the curve into segments including the first segment and the second segment such that the second segment monotonically progresses away from the position from a known nearest point of the second region;
    determining that a distance from the position to a point of the first segment is not greater than a distance from the position to a known nearest point of the second region;
    calculating of a shortest distance from the position to the first segment as a shortest distance from the position to either of the first segment and the second segment without calculating a distance from the position to at least one point of the second segment other than the known nearest point of the second region; and
  causing displaying, on the map, of an indication of the point of the curve nearest to the position.

12. The medium of claim 11, wherein:
  dividing of the monotonic segment of the curve into segments including the first segment and the second segment comprises dividing of the monotonic segment of the curve into segments including the first segment, the second segment, and a third segment bounded by a third region, such that the third segment monotonically progresses away from the position from a known nearest point of the third region; and
  identifying of the point of the curve nearest to the position further comprises calculating of a distance from the position to the known nearest point of the third region as a shortest distance from the position to the third segment without calculating a distance from the position to at least one point of the third segment other than the known nearest point of the third region.

13. The medium of claim 11, wherein determining that the distance from the position to the point of the first segment is not greater than the distance from the position to the known nearest point of the second region comprises determining that a distance from the position to a known farthest point of the first region is not greater than the second distance.

14. The medium of claim 13, wherein the map is three-dimensional, the first region is a rectangular cuboid, and the known farthest point of the first region is a farthest corner of the first region.

15. The medium of claim 13, wherein the map is two-dimensional, the first region is a rectangle, and the known farthest point of the first region is a farthest corner of the first region.

16. The medium of claim 11, wherein the map is three-dimensional, the second region is a rectangular cuboid, and the known nearest point of the second region is a nearest corner of the second region.

17. A non-transitory computer-readable medium storing program instructions for displaying a position on a map, the program instructions being executable by a processor of an electronic device to effect:

appreciating of coordinates of the position;

appreciating of coordinates of an object having a curve near the position;

identifying of a point of the curve nearest to the position, said identifying comprising identifying of a monotonic segment of the curve bounded by a region having a known nearest point to the position;

determining that the monotonic segment monotonically progresses away from the position from the known nearest point;

calculating of a distance from the position to the known nearest point of the region as a shortest distance from the position to the monotonic segment without calculating a distance from the position to at least one point of the monotonic segment other than the known nearest point of the region; and causing displaying, on the map, of an indication of the point of the curve nearest to the position.

18. The medium of claim 17, wherein the map is three-dimensional, the region is a rectangular cuboid, and the known nearest point of the region is a nearest corner of the region.

19. The medium of claim 17, wherein the map is two-dimensional, the region is a rectangle, and the known nearest point of the region is a nearest corner of the region.

20. The medium of claim 17, wherein calculating of a distance from the position to the known nearest point of the region as a shortest distance from the position to the monotonic segment without calculating a distance from the position to at least one point of the monotonic segment other than the known nearest point of the region is calculating of a distance from the position to the known nearest point of the region as a shortest distance from the position to the monotonic segment without calculating a distance from the position to any point of the monotonic segment other than the known nearest point of the region.

\* \* \* \* \*